Oct. 11, 1955     R. K. LARES     2,720,283
LUBRICANT FITTING
Filed March 5, 1951
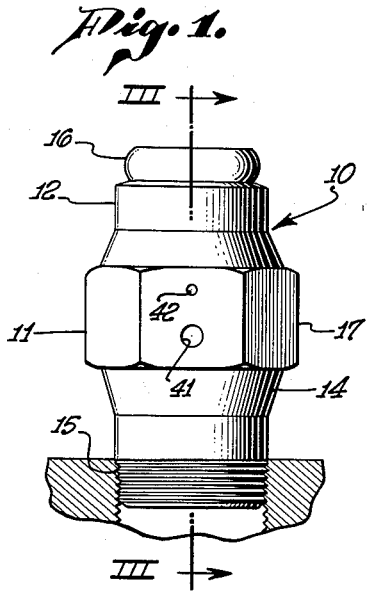
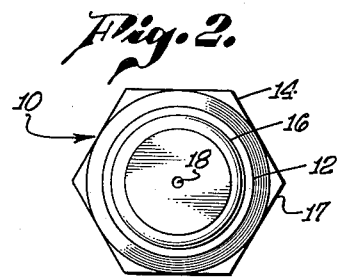
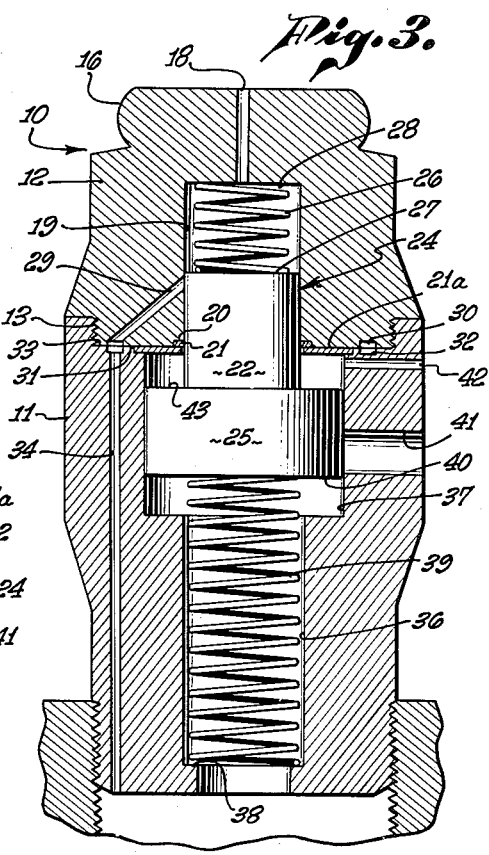
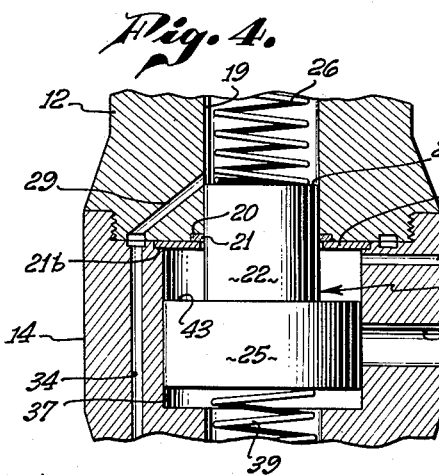
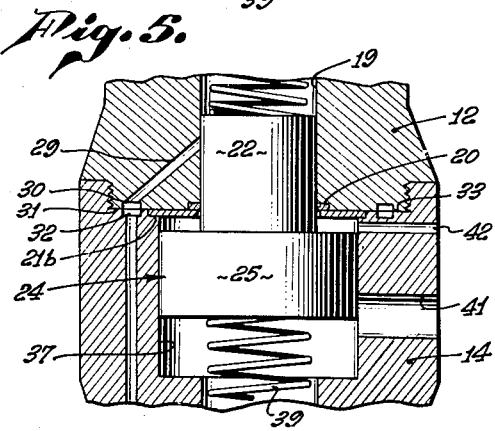
ROBERT K. LARES,
INVENTOR.
BY
ATTORNEY.

United States Patent Office 2,720,283
Patented Oct. 11, 1955

2,720,283
LUBRICANT FITTING

Robert K. Lares, Eagle Rock, Calif.

Application March 5, 1951, Serial No. 213,824

12 Claims. (Cl. 184—105)

This invention relates to an improved lubricant fitting and more particularly to a fitting which is responsive to bearing chamber lubricant pressures to prevent development of excessive pressure therein, and which is capable of accurately and truly indicating the quantity of lubricant in a bearing chamber with respect to a filled or non-filled condition.

Anti-friction bearings employed in various types of machinery are required to be periodically lubricated to maintain proper lubrication of the moving machinery parts therein. Such bearings are provided with bearing seals to hold lubricant within the bearing chamber and to prevent escape of lubricant therefrom. Usually lubricant is fed into such bearings under pressure through a lubricant fitting.

The problems of lubricating such bearings include that of determining when the bearing is filled with a required quantity of lubricant and when the lubricant in the bearing is subjected to excessive pressure caused by overfeeding of lubricant into the bearing chamber by the pressure lubrication gun.

Some prior proposed lubrication fittings did not accurately respond to excessive pressure conditions in the bearing and blowing out of the sealing ring in the bearing often resulted and lubricant escaped. In addition, some of the lubricant fittings depended solely upon a pressure condition in the bearing chamber to indicate the status of the lubricant supply in the bearing. Such pressure indication might be caused by excess lubricant, by the presence of trapped air in the bearing chamber, or by a combination of both. It was thus possible for an operator to believe that an ample quantity of lubricant was in the bearing chamber because of indicated pressures whereas, in fact, the bearing chamber may have been only partially filled with lubricant and in quantity insufficient to provide the desired and proper lubrication. In some prior proposed devices which included an arrangement for permitting excessive lubricant to escape, means were not usually included to positively prevent further escape of lubricant after the excess quantities had been forced from the bearing chamber. Thus, in operation, liquified lubricant might escape the bearing chamber and thus reduce the effectiveness of the lubrication. In food machinery, any escape of lubricant during processing of foods presented a serious problem because of the likelihood of contamination of the food.

The primary object of this invention is to design and provide an improved lubricant fitting which is responsive to quantity and pressure of lubricant within a bearing chamber in order to limit the amount and pressure of lubricant as desired.

Another object of this invention is to design and provide a lubricant fitting, wherein means are provided to make the fitting responsive to selected excess pressures in the bearing chamber.

Still another object of this invention is to design and provide a lubricant fitting, wherein means are provided for release of excess lubricant during the filling operation and wherein a relief port for said excess lubricant is automatically sealed after the filling operation.

A further object of this invention is to design and provide a lubricant fitting employing a floating spring positioned differential valve means operable to automatically and selectively limit the quantity and pressure of lubricant introduced into the bearing chamber.

A further object of this invention is to design and provide a lubricant fitting, such as above described, which is inexpensive, easy to manufacture and comprises a minimum number of parts.

A further object of this invention is to design and provide a lubricant fitting wherein virtually floating valve means are arranged to seal a filling port after each pressure stroke of a lubricant gun.

This invention contemplates a lubricant fitting comprising a separable body member having a top filling head portion affording a gun connection and a bottom portion adapted to communicate with a bearing chamber. The top portion includes an inlet filling port and a bore at the end of said port, said bore slidably accommodating a stem of a piston type valve member, the stem normally closing a lubricant feed passageway. The bottom portion includes an enlarged chamber cooperable with the piston type valve member and a bore leading from said chamber to the bearing chamber. The lubricant feed passageway leads from the bore in the top portion through the bottom portion to the bearing chamber. The valve member is virtually floatingly suspended between oppositely acting spring means of pre-selected capacity contained in the bore of the top portion and the bore of the bottom portion. A relief port leads from the chamber in which the valve member operates and is normally closed by said valve member when the bearing chamber is under normal selected pressures.

The spring supported valve member is responsive to pressures from the lubricant filling gun to open the feed passageway to the bearing while still covering the relief port, and is responsive to pressure in the bearing to close the feed passageway and to open the relief port. The capacity of the springs selected determine the final position taken by the valve member, the balancing of the spring action against the bearing pressure serving to determine the amount of bearing pressure permitted.

Other objects and advantages of this invention will be readily apparent to those skilled in the art from the following description of the drawings:

In the drawings:

Fig. 1 is a side view of a lubricant fitting embodying this invention.

Fig. 2 is a top view of Fig. 1.

Fig. 3 is an enlarged sectional view taken in the plane indicated by line III—III of Fig. 1 and showing the valve member in normal position.

Fig. 4 is a fragmentary sectional view taken in the same plane as Fig. 3, showing the position of the valve member when lubricant fluid is being injected into a bearing chamber.

Fig. 5 is a fragmentary sectional view taken in the same plane as Fig. 3 showing the position of the valve member when an excessive pressure condition exists in a bearing chamber.

The lubrication fitting, generally indicated at 10, in the drawings comprises a separable body member 11 having a top portion 12 in threaded engagement at 13 with one end of a bottom portion 14. The bottom portion 14 is provided at the other end with external threads 15 adapted to engage a threaded opening into a bearing chamber to be lubricated.

The top portion 12 may be provided with suitable external configuration as at 16 so as to be cooperably received within a discharge head of any well known type of pressure or hand lubrication gun. The bottom portion 14 may be provided with an external hexagonal configuration as at 17 to facilitate installation of the fitting in the wall of a bearing chamber.

The top portion 12 includes an axial inlet port 18 communicating with an axial filling bore 19 of larger diameter than the port. The bore 19 is formed with an annular recess 20 encircling its inner end to provide a seat for a suitable seal ring 21. Inner margins of a flat annular ported washer 21a of suitable material hold said ring in said recess, the outer circumferential margins of said washer being seated in an annular recess 21b of slightly less depth than the washer encircling the upper end of chamber 37. The washer 21a is held in position by the threading together of the top and bottom portions.

The bore 19 slidably accommodates therein, as in a wiping fit, with respect to sealing ring 21, a cylindrical stem 22 of an imperforate solid piston type valve member 24, said valve member 24 having an enlarged piston head 25 slidable in said chamber 37. A suitable coil spring 26 of pre-selected capacity extends between the top end face 27 of stem 22 and an internal shoulder 28 defined between the port 18 and the bore 19.

Leading from an intermediate point on the bore 19 may be a diagonally disposed lubricant feed passageway 29, said passageway terminating in an annular groove 30 provided on an inner annular end face 31 of the top portion 12. The annular groove 30 cooperates with an annular groove 32 of like diameter formed in an annular end face 33 of the bottom portion 14 for providing an annular raceway for lubricant. The bottom portion 14 is provided with a lubricant feed passageway 34 disposed parallel to the axis of the bottom portion and in communication with groove 32. Thus the grooves 30 and 32 cooperate to form an annular raceway whereby communication is provided between passageway 29 and passageway 34 regardless of the final threaded relationship of the top and bottom portions. The feed passageway 34 in the bottom portion 14 leads to and communicates with a bearing chamber to which the fitting is connected.

The bottom portion 14 includes an axial bore 36 leading from a bearing chamber to the enlarged pressure relief chamber 37 in which the piston head 25 is reciprocally slidable. The outer end of bore 36 is provided with an inwardly directed annular lip providing an internal shoulder 38 affording a spring seat for one end of a coil spring 39 within said bore 36. The other end of spring 39 may be suitably seated and positioned upon face 40 of the piston head 25.

The chamber 37 is provided with a radially disposed relief port 41 formed intermediate the top and bottom of the chamber 37 and adapted to convey flow of excess lubricant from the bearing chamber. A second radially disposed relief port or vent 42 formed adjacent the top of chamber 37 is adapted to release lubricant which might accumulate between the back face 43 of the piston head 25 and the opposed face of the washer 21a. It should be noted that the piston head 25 has sufficient depth so as to completely cover the relief port 41.

The springs 26 and 39 are installed under compression so that when piston head 25 reaches its limit of travel in either direction in chamber 37, the springs will still be maintained under compression in order to exert a force upon the valve member. The springs 26 and 39 are so selected, as to capacity, that when correlated with the area of the piston head face 37 and the stem end face 27, the valve member will be positioned within chamber 37 so as to normally close relief port 41 and the stem of the valve member will just close feed passageway 29. Obviously, the capacity of the springs may be varied so that when the bearing chamber is filled with lubricant, the lubricant may be maintained under a desired selected pressure with the piston valve member closing relief port 41.

When a bearing chamber employing the fitting described above is to be lubricated, a pressure lubricant gun may be fitted on the top filling head 12. Operation of the gun is normally in a manner whereby lubricant is intermittently and repeatedly ejected under pressure into the lubricant fitting. Each ejection of lubricant into bore 19 forces the piston valve member downwardly and opens passageway 29 (Fig. 4). Lubricant flows through passageway 29 into the annular raceway 30, 32 and through passageway 34 into a bearing chamber to be lubricated. At the end of each ejection, spring 39 causes the piston valve 24 to return to its normal position closing passageway 29 as in Fig. 2.

As lubricant is thus fed into the bearing chamber and the bearing chamber begins to fill, any trapped air within the bearing chamber has a tendency to bubble upwardly and outwardly through bore 36 in the bottom portion 14. Introduction of lubricant at a point spaced from the exit of said lubricant from the bearing chamber into bore 36 facilitates this release of trapped air from the bearing.

When the bearing chamber is completely filled with lubricant and excess lubricant is introduced thereto, pressure exerted by said excess lubricant overpowers spring 26 and causes piston head 25 to move upwardly exposing and opening relief port 41 (Fig. 5). The opening of port 41 permits excess lubricant to be discharged from the bearing chamber. As long as the pressures or forces acting on the bearing chamber side of the valve member are sufficient to overpower spring 26 acting in bore 19, the fitting will automatically relieve the bearing chamber of excessive pressures. It will thus be readily apparent that by proper selection of springs 26 and 39 pressures cannot be developed even temporarily in the bearing chamber in sufficient force to blow out a bearing seal.

The valve member 24 should be freely floatable under the influence of springs 26 and 39. Such condition requires that stem 22 and head 25 be provided a relatively loose wiping fit in bore 19 and chamber 37 respectively. Such relationship may later permit leakage of lubricant into the chamber 37 between the annular face 43 of the piston head and the opposed face of washer 21a.

Accumulation of lubricant in such space will prohibit the virtually freely floating relationship desired of the piston valve member 24 in order to respond accurately to excess pressure in the bearing. To prevent any counter pressures acting against piston head 25, which might tend to close relief port 41, the vent 42 is provided for permitting escape of lubricant and air from this space.

It will be understood that the diameter of the piston head, the diameter of the piston stem and the capacity of springs 26 and 39 may be so selected as to provide a desired response of the piston valve member to pressures communicated from the bearing chamber. The closure of passageway 29 by the piston stem provides a positive means for eliminating the introduction of dirt or foreign matter into the bearing chamber. The provision of an excess lubricant relief port 41 provides a means for controlling the discharge point of excess lubricant. Suitable means may be placed adjacent relief port 41 for collecting excess lubricant discharged so that lubricant will not fall upon the floor or other machinery parts where it may later come in contact with and contaminate articles being processed by the machinery. It should also be noted that as excess lubricant is discharged from the relief port, pressure in the bearing is reduced and relieved. During the pressure reduction the valve member slowly closes the relief port 41 so that when the selected bearing pressure is reached, port 41 is completely closed and excess lubricant flow therefrom is stopped.

The simple effective construction of the lubricant fitting described above affords a single valve member which responds to the amount and pressure of lubricant in a bearing so as to positively limit the quantity of lubricant introduced and to thereby limit the pressure of lubricant in the bearing. Such automatic response positively prevents the creation in the bearing of an excessive pressure condition which might distort or blow out a bearing seal. Bearing failure from over-greasing and excess pressure is virtually eliminated. Furthermore, bearing failure from lack of sufficient lubricant is reduced to a minimum because the method of feeding lubricant to the bearing at a point spaced from the discharge of excess lubricant from the bearing tends to relieve and free trapped air in the bearing.

It is understood that the differential valve member may be varied in size and dimension to obtain a selected response to lubricant pressures. The lubricant feed passageway and bearing lubricant relief means including the chamber 37 and relief port 41 may also be varied in size and relationship. The angles at which the filling port and relief port are constructed may be readily varied for adaptation of the fitting to a particular installation.

All modifications and changes made in the embodiment of the invention described above and coming within the scope of the appended claims are embraced thereby.

I claim:

1. In a lubrication fitting, the combination of: a separable body member including a top body portion having a filling chamber with an open end and an inlet port leading to said chamber; a feed passageway leading diagonally from said chamber; a bottom body portion having an enlarged relief chamber having an end facing the open end of the filling chamber and a relief bore adapted to communicate with a bearing to be lubricated; a feed passageway in the bottom portion in communication with the feed passageway in the top portion and with the bearing; a relief port leading from the relief chamber; spring means positioned within said filling and relief chambers; and piston type valve means positioned by said spring means and including a stem extending from said relief chamber into said filling chamber and a head operable in said relief chamber.

2. In a lubricant fitting, the combination of: a separable body member including a top body portion having a filling chamber and an inlet port leading to said chamber; a feed passageway leading diagonally from said chamber; a bottom body portion having an enlarged relief chamber and a relief bore adapted to communicate with a bearing to be lubricated; a feed passageway in the bottom portion in communication with the feed passageway in the top portion and with the bearing; a relief port leading from the relief chamber; spring means positioned within said filling and relief chambers; and a valve means cooperable with said spring means for normally closing the relief port and the feed passageway in the top portion under selected pressure conditions of the bearing to be lubricated.

3. In a lubrication fitting, the combination of: a body member including a top body portion having a filling chamber adapted to communicate with a lubricant gun; a feed passageway leading from said chamber; a bottom body portion having an enlarged relief chamber and a relief bore adapted to communicate with a bearing to be lubricated; a feed passageway in the bottom portion adapted to communicate with the passageway in the top portion and with the bearing; a relief port leading from the relief chamber; a valve member slidable in said filling chamber and in said relief chamber for opening and closing the passageway in said top portion and the relief port in said bottom portion; and counterbalancing spring means positioned in said top and bottom portions and cooperable with the valve means for selectively controlling response of the valve means to pressures within the bearing.

4. In a lubricant fitting, the combination of: a body member including a top body portion having a bore therein adapted to receive lubricant, and a bottom body portion having an enlarged chamber adapted to be in communication with a bearing to be lubricated, said bore opening into said chamber; a relief port leading from said chamber; a passageway leading from said bore and extending through said bottom portion to the bearing; resilient means in the bore and in the chamber; a valve member extending between said resilient means and having an extension slidable in said bore and a head slidable in said chamber, said resilient means being of preselected capacity to normally position said valve member with said extension and said head to close the passageway and the relief port respectively under preselected pressure conditions in said bearing.

5. A lubricant fitting as defined in claim 4 wherein the passageway includes an annular raceway between the top and bottom portions.

6. A lubricant fitting as defined in claim 4 wherein seal means is provided in said bore for engagement with said extension on said valve member.

7. In a lubricant fitting, the combination of: a body member comprising means including an internal passageway having an inlet part for flow of lubricant along a path to a bearing to be lubricated; means including a relief port for flow of lubricant from the bearing along a path separate from said first path; and means including a spring positioned valve member extending between said inlet port and said relief port and responsive to pressure of filling lubricant and bearing lubricant, said valve member being normally positioned to close said passageway and said relief port under selected pressures within the bearing, said valve member closing said relief port and opening said inlet port in filling position and in relief position closing the inlet port and opening the relief port.

8. In a lubricant fitting, the combination of: a body member comprising mean including an internal passageway having an inlet port for flow of lubricant along a path to a bearing to be lubricated; means including a relief port for flow of lubricant from the bearing along a path separate from said first path; and means including a valve member extending between and normally positioned to close said inlet port and relief port, and springs acting against opposite ends of said member to normally position said valve member, said member being movable in response to pressure of filling lubricant and bearing lubricant to open said inlet port and to open said relief port respectively under predetermined pressure conditions.

9. In a lubricant fitting, the combination of: a body member provided with a filling chamber and a relief chamber of greater cross sectional area than the filling chamber; a passageway including an inlet port connecting said filling chamber to a bearing to be lubricated; a relief port in the body member in communication with the relief chamber; a movable valve member positioned in said filling chamber and said relief chamber and normally extending between said inlet port and said relief port for closure of both ports; said valve member presenting an end face of selected area to filling lubricant in the filling chamber and an oppositely directed end face of greater area in the relief chamber to lubricant from the bearing to be lubricated; and spring means in the filling chamber and relief chamber acting against said end faces to normally position said valve member to close said inlet port and relief port under selected pressure conditions.

10. In a lubricant fitting, the combination of: a body member comprising means including an internal passageway having an inlet port for flow of lubricant along a selected path to a bearing to be lubricated; means including a second internal passageway having a relief port for flow of excess bearing lubricant along a separate path from a bearing being lubricated; spring means; and obturate means extending between said inlet and relief ports and normally positioned by said spring means to close both of said ports when said bearing is full, said port closing means being responsive to pressure of filling lubricant and movable in immediate response to pressure conditions within the bearing for relief of excessive pressure within the bearing.

11. In a lubricant fitting, the combination of: a body member comprising means including an internal passageway having an inlet port for flow of lubricant along a path to a bearing to be lubricated; means including a relief port for flow of lubricant from the bearing along a path separate from said first path; spring means; and a single obturate valve member responsive to pressure of filling lubricant and bearing lubricant and extending between said inlet port and said relief port, said responsive member being normally positioned by said spring means to close said inlet port and relief port under selected pressures within the bearing, and being movable in direct response to pressure of lubricant within a bearing to relieve excessive pressure through said relief port.

12. In a lubricant fitting, the combination of: a body member provided with an internal passageway having an inlet port for flow of lubricant directly along a path to a bearing to be lubricated; means including a relief port for direct flow of lubricant from the bearing to relieve pressures excessive to selected pressures within the bearing; a single obturate valve member responsive to pressure of filling lubricant and bearing lubricant and extending between said inlet port and said relief port; and spring means positioning said valve member for normally closing said inlet port and relief port under selected pressures within the bearing, said valve member being immediately movable in direct response to pressure of bearing lubricant in excess of selected pressures to open said relief port.

References Cited in the file of this patent

UNITED STATES PATENTS

| | | |
|---|---|---|
| 2,025,502 | Fageol | Dec. 24, 1935 |
| 2,232,359 | Barks | Feb. 18, 1944 |
| 2,351,909 | Beretish | June 20, 1944 |
| 2,410,480 | Davis | Nov. 5, 1946 |

FOREIGN PATENTS

| | | |
|---|---|---|
| 593,634 | Great Britain | Oct. 22, 1947 |